(12) United States Patent
Travis

(10) Patent No.: US 7,545,429 B2
(45) Date of Patent: Jun. 9, 2009

(54) FLAT-PANEL CAMERA

(75) Inventor: Adrian Robert Leigh Travis, South Devon (GB)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 10/432,492

(22) PCT Filed: Nov. 29, 2001

(86) PCT No.: PCT/GB01/05266

§ 371 (c)(1),
(2), (4) Date: Oct. 3, 2003

(87) PCT Pub. No.: WO02/45413

PCT Pub. Date: Jun. 6, 2002

(65) Prior Publication Data

US 2004/0046870 A1      Mar. 11, 2004

(30) Foreign Application Priority Data

Nov. 30, 2000   (GB)   ................................. 0029340.7

(51) Int. Cl.
*H04N 5/225* (2006.01)
(52) U.S. Cl. ........................................ 348/335; 348/337
(58) Field of Classification Search .................... 353/81, 353/82; 385/132; 348/211.13, 335, 340, 348/344, 211.11, 211.12, 337, 338; 359/242, 359/267, 34; 349/11
See application file for complete search history.

(56) References Cited

U.S. PATENT DOCUMENTS

| 3,941,467 | A | | 3/1976 | Kapany et al. |
| 5,303,322 | A | * | 4/1994 | Winston et al. ............. 385/146 |
| 5,528,720 | A | * | 6/1996 | Winston et al. ............. 385/146 |
| 5,594,830 | A | * | 1/1997 | Winston et al. ............. 385/146 |
| 5,706,136 | A | * | 1/1998 | Okuyama et al. ........... 359/630 |
| 5,734,447 | A | * | 3/1998 | Loiseaux et al. ................ 349/5 |
| 5,815,741 | A | * | 9/1998 | Okuyama et al. ............. 396/51 |
| 5,912,764 | A | * | 6/1999 | Togino ....................... 359/367 |
| 5,933,279 | A | * | 8/1999 | Yamazaki ................... 359/630 |
| 5,993,020 | A | * | 11/1999 | Koike ......................... 362/628 |
| 6,002,826 | A | * | 12/1999 | Veligdan ..................... 385/120 |
| 6,222,971 | B1 | * | 4/2001 | Veligdan et al. ............. 385/120 |
| 6,323,892 | B1 | * | 11/2001 | Mihara ..................... 348/14.01 |
| 6,356,391 | B1 | * | 3/2002 | Gardiner et al. ............. 359/628 |
| 6,646,811 | B2 | * | 11/2003 | Inoguchi ..................... 359/631 |
| 7,209,628 | B2 | * | 4/2007 | Winston et al. ............. 385/146 |
| 2002/0003593 | A1 | * | 1/2002 | Arakawa et al. ............. 349/65 |

FOREIGN PATENT DOCUMENTS

| EP | 0663600 A1 | | 7/1995 |
| GB | 2360603 A | * | 9/2001 |
| WO | WO 01/72037 A1 | | 9/2001 |

\* cited by examiner

*Primary Examiner*—David L Ometz
*Assistant Examiner*—Gary C Vieaux

(57) ABSTRACT

A flat-panel camera comprises a tapered transparent slab 1, a prismatic sheet 3 for introducing light into one face of the slab at near the critical angle so that it is reflected along the slab towards the thick end, and a miniature camera 2 receiving light emerging from the thick end of the slab at an angle depending on where the light entered the slab. An image processor 7 eliminates distortion in the image such as gaps caused by the light missing the camera.

9 Claims, 7 Drawing Sheets

FLAT-PANEL CAMERA

This invention concerns a way of forming an image from light falling on a flat screen.

Cameras conventionally comprise an opaque cavity with a lens covering the opening of the cavity and a light-sensitive film at the rear. The distance between film and lens must be greater than the focal length of the lens if the image is to be in focus, so cameras are usually bulky. In applications such as photocopying it is desirable to have a camera which is flat, and in applications such as video conferencing the camera should furthermore have an optical axis in the centre of and perpendicular to a flat-panel display, so that users are seen to look directly at those with whom they are in conference.

Recently there was disclosed in the applicants' WO 01/72037 a tapered display which comprises a video projector and a tapered sheet of glass. The video projector itself comprises a source of approximately collimated illumination, a microdisplay, a condensing lens and a projection lens. As the rays leave the projection lens they form a narrow waist. At this point the rays are passed into the thick end of the tapered sheet glass so as at least initially to travel along within the sheet by reflections off its two faces alternately. When a ray is shone into the thick end of a sheet of glass which tapers, then the out-of-plane angle measured with respect to one face of the taper will increase each time the ray reflects off the opposite face of the taper. Eventually the ray propagates far enough along the taper that the out-of-plane angle becomes greater than the critical angle, and at this point light escapes the taper. The distance into the tapered sheet of glass at which the ray leaves the taper is therefore determined by the angle at which the ray is injected. In this way the 2D array of pixels on the microdisplay is mapped one-to-one to a 2D array of pixels on the face of the tapered waveguide. An anti-reflection coating is needed to ensure that all the light leaves the screen when the ray reaches the critical angle, otherwise there is blurring between adjacent rows of the image.

The invention essentially reverses this process. According to the present invention there is provided a flat-panel camera comprising a tapered transparent slab, preferably with means for introducing light into one face of the slab at a glancing angle, and a miniature camera arranged to receive this light emerging from the thick end of the slab.

For a shallow taper only light entering at a glancing angle will remain within the slab: light incident any nearer the vertical will escape from the other side of the slab because of the somewhat greater angle of incidence arising from the tapered shape. The tapered slab or waveguide thus "selects" light incident at a glancing angle for presentation to the camera. The input angle can be adjusted by suitable light-introducing means so that only light incident at, say, a normal angle ends up at the camera; one could say thereof that the camera takes a projected image of what is in front of it.

Preferably an image processor is associated with the camera to correct distortions introduced by the system to the image. The light-introducing means can be a prismatic sheet or film on one surface of the slab, the prisms being arranged to direct perpendicularly incoming light partly towards the camera so that it enters the slab at near the critical angle. Alternatively a diffractive arrangement can be used to this end.

For a better understanding of the invention embodiments of it will now be described, by way of example, with reference to the accompanying drawings, in which.

Figure 1:
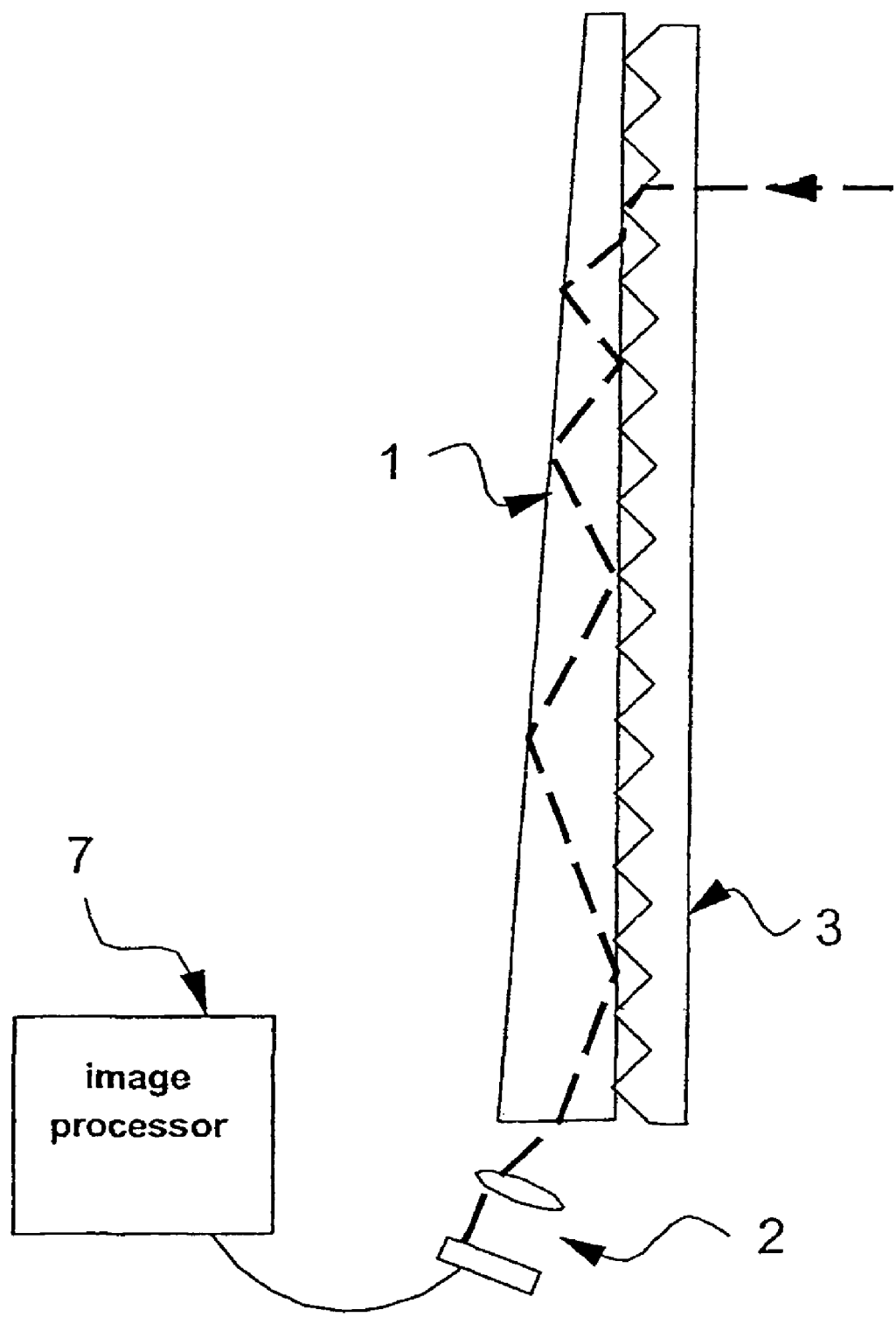
FIG. 1 illustrates a side view of a flat-panel camera in accordance with the invention.

Referring to FIG. 1, the camera comprises a transparent uniformly and one-dimensionally tapered slab 1, the taper being about 0.1°, a corresponding one-dimensionally prismatic sheet 3 on one face of the slab with the prisms facing the slab, a miniature camera 2 at the thick end of the taper, a miniature the middle along this edge, and an image processor 7. An incoming image is indicated by an arrow falling on the prism sheet 3. Rays incident to the normal of the prismatic film 3 are bent by the prisms through almost ninety degrees so that the rays enter the tapered transparent slab 1 at an angle just greater than the critical angle. FIG. 1 shows how a typical ray then propagates down the tapered slab 1 in such a way that the further the point of entry of the ray from the thick end of the tapered slab 1, the less the angle between the ray and the plane of the slab when the ray leaves the thick end. The rays may then be focused by the lens of a miniature camera 2, i.e. one much smaller than the apparatus as a whole, onto its light-sensing plane in such a way as to form an image, or a projected picture, of the scene to the front of the tapered slab 1. Preferably the tapered slab 1 is coated with an anti-reflection coating designed in a similar manner to that for tapered flat-panel projection displays in order that as much light is collected as possible.

Figure 2:
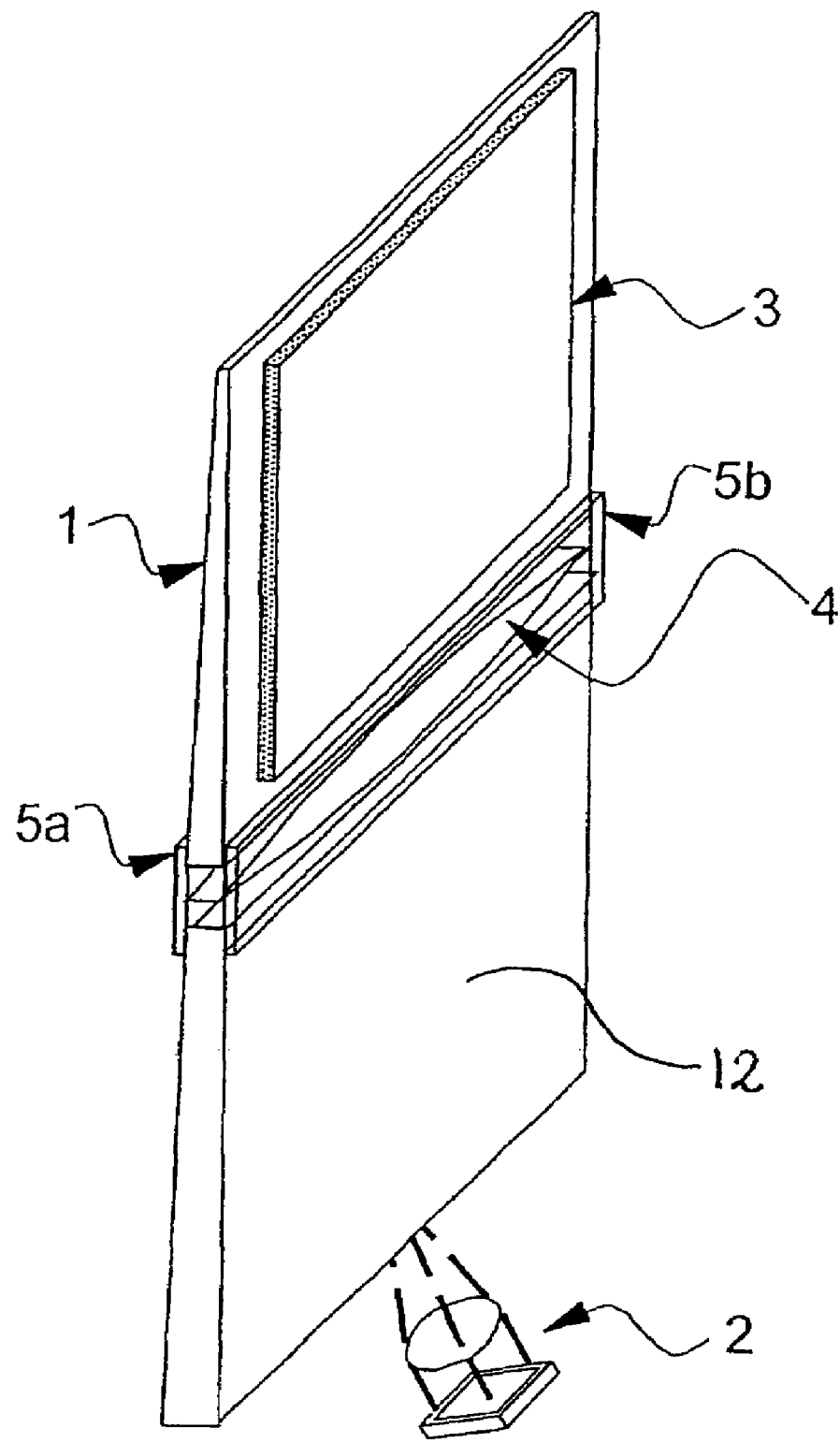
FIG. 2 illustrates a perspective view of the flat-panel camera with a cylindrical lens added to reduce distortion.

Rays entering the transparent slab 1 from positions above or below the plane of FIG. 1 (i.e. not head-on or centrally but partially from the side) will only reach the camera 2 if the angle of the rays relative to the plane of FIG. 1 is already such that they are travelling towards the camera 2. The result is a distorted image. This distortion can be reduced with a cylindrical lens 4 placed at the bottom of the slab 1 at the lower end of the prismatic film 3 as shown in FIG. 2, with a pair of front-silvered mirrors 5a and 5b which confine light to the tapered slab 1 and guide it through the lens into an adjacent output slab 12 which can continue the taper of the imaging slab 1 or be flat. The focal point of the cylindrical lens 4 is chosen to be at the far end of the output slab 12 so that all rays normally incident on the prismatic film 3, including those off the normal plane containing the camera, are guided into the miniature camera 2.

An alternative to this arrangement is to place a large cylindrical lens over the whole of the prismatic film 3 with the axis of the cylindrical lens parallel to the direction in which the tapered slab 1 tapers. A further alternative is to use a cylindrical mirror instead of the lens 4; here the arrangement would have to be "folded" so that the output slab was parallel and adjacent to (on top of) the imaging slab.

Figure 3:
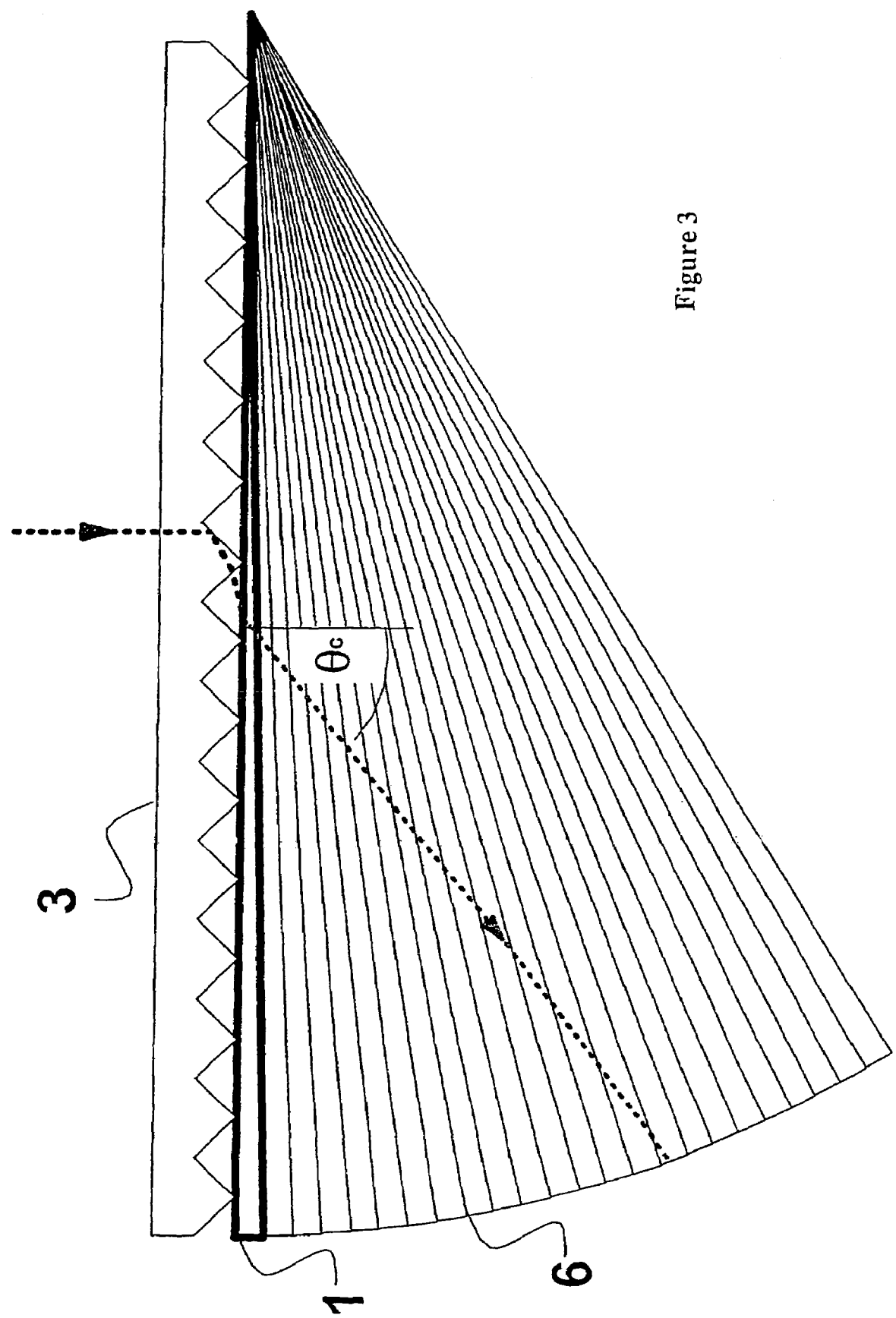
FIG. 3 illustrates how the passage of a ray through the tapered slab can be found by tracing a straight ray through mirror images of the tapered slab.
Figure 4:
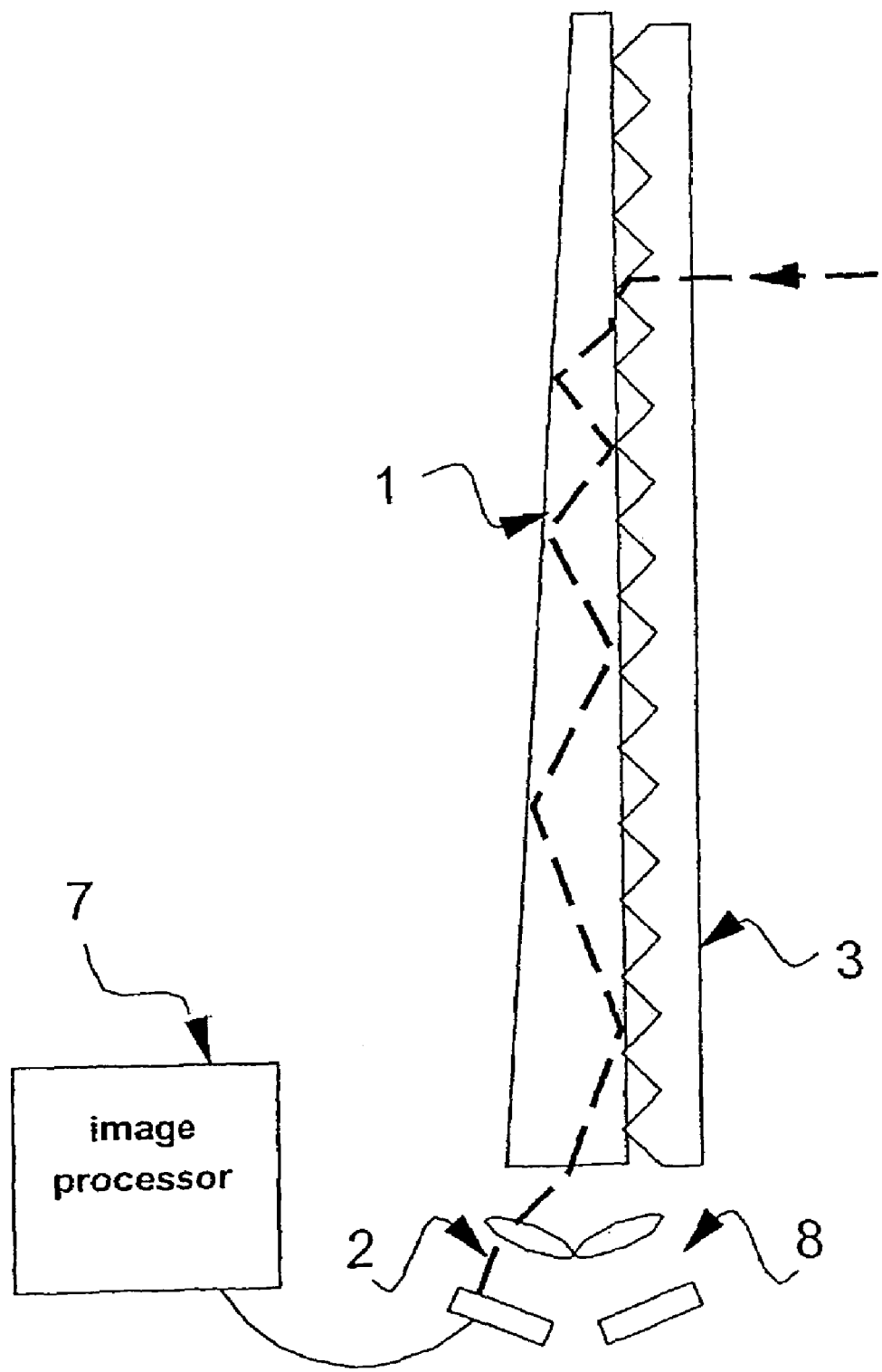
FIG. 4 illustrates how a second miniature camera may be added to collect light missing the first.
Figure 4A:
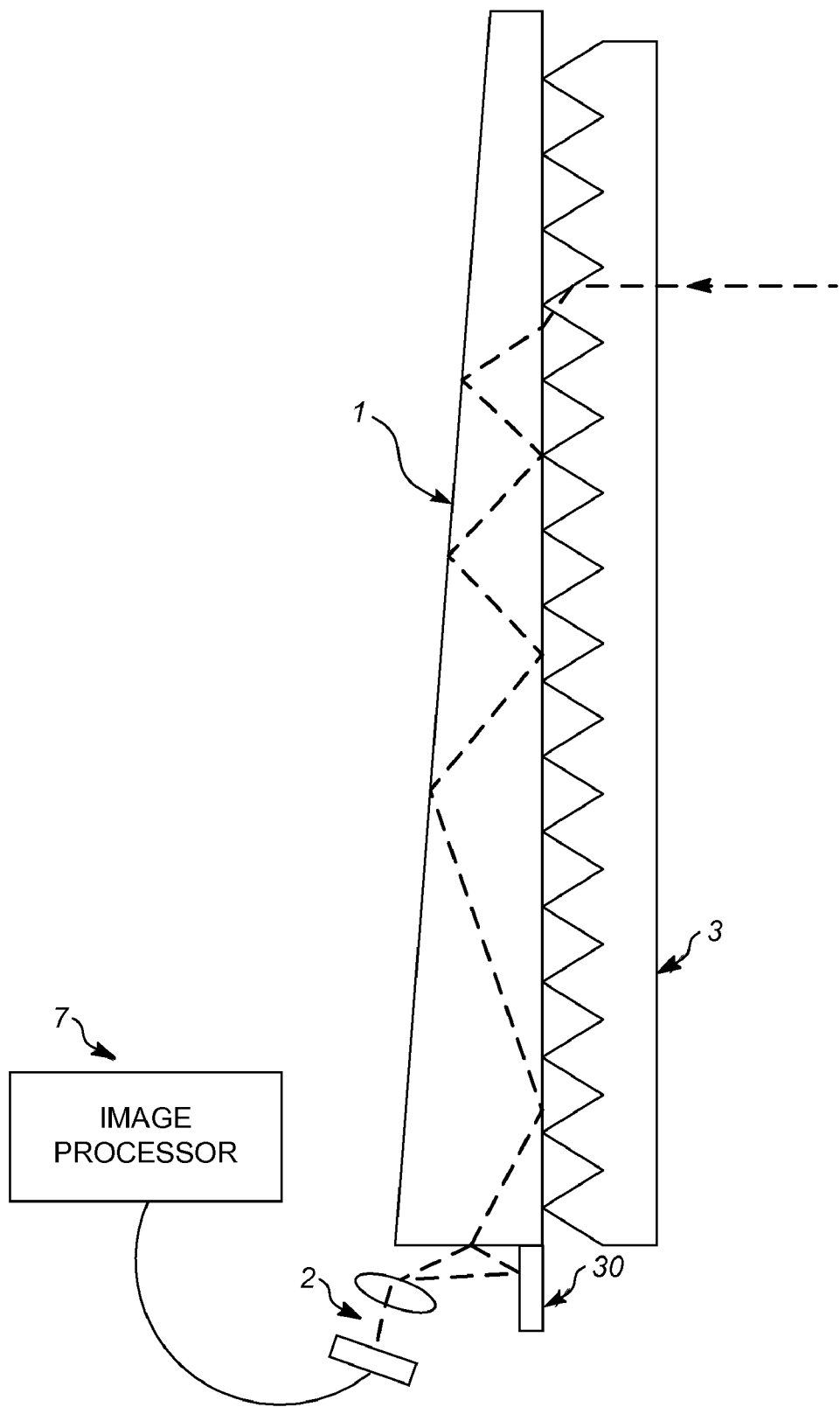
FIG. 4A illustrates how a mirror may be added to reflect light missing the first miniature camera.

In order to trace rays through the tapered slab 1, it is helpful to think of tracing a straight ray through a stack of wedge images 6, which is optically equivalent to FIG. 1. FIG. 3 shows how the position at which a ray enters the tapered slab 1 will determine whether it passes through an odd or even number of wedge images in the stack 6 before reaching the thick end. If the ray passes through an odd number of wedge images 6 then it will leave the tapered slab 1 in the opposite direction to that obtaining when the ray passes through an even number of wedge images 6. The miniature camera 2 will therefore form an image comprising bands of the image to the front of the tapered slab 1, interspersed either with dark gaps (if no light enters the rear of the tapered slab 1) or with bands of whatever image is to the rear of the tapered slab 1. An image processor 7 is therefore needed to separate the image to the front of the tapered slab 1 from that to the rear; a suitable algorithm for the image processor 7 can be designed by one trained in geometrical optics. If illumination levels are low, one can add a second miniature camera 8 pointing into the thick end of the tapered slab 1 so as to collect parts of the image which miss the first miniature camera 2, as shown in FIG. 4. Alternatively a mirror 30 can be inserted at the end of the slab and continuing the face adjacent to the sheet 3, so as to reflect the light emerging at the "wrong" angle towards the camera 2, as shown in FIG. 4A.

Light passing through the tapered slab 1 will be subject to chromatic aberration, and this may be corrected either by the image processor 7, or by a prism whose aberration is opposite to that of the tapered slab 1 placed between the miniature camera 2 and the thick end of the wedge, in a similar manner to that described in GB 0028800.1 for tapered flat-panel displays. Similarly it may be convenient to fold the lower part 12 of the tapered slab 1 behind that underneath the prismatic screen 3, and this can be done in a similar manner to that used for tapered flat-panel projection displays. The prismatic screen may alternatively be a diffraction grating or any other film which bends rays to an angle where they enter the tapered slab 1 at close to the critical angle so that once in the slab they stay in it.

Figure 5:
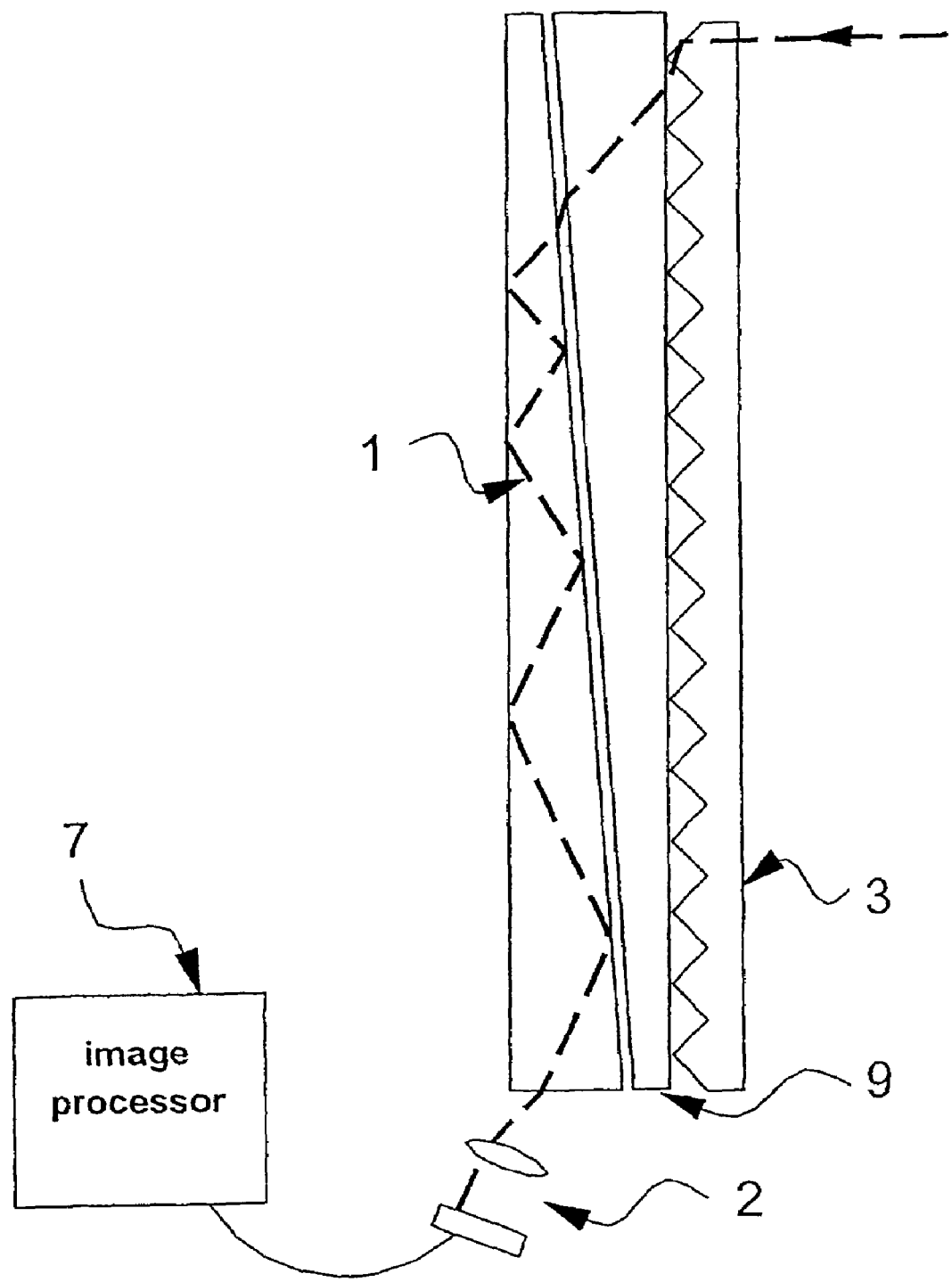
FIG. 5 illustrates how a second tapered slab may be added to reduce distortion.

When a set of rays from a point on the scene enter the tapered slab 1, they are distorted because their direction is so near the critical angle, and this can lead to blurring of the rows. The distortion is determined by Snell's law, and it can be shown that a ray entering the tapered slab at an angle $\delta\theta_1$, to the surface has an angle $\delta\theta_2$ relative to the critical angle after entry, where:

$$\delta\theta_1 \approx \sqrt{2}\sqrt{n^2-1}\delta\theta_2$$

n is the refractive index of the material of the slab, say glass, and might be about 1.5. If for example the miniature camera 2 collects rays which after entry into the slab are at angles between 0° and 0.05° from the critical angle, then before entry into the slab those rays will have angles varying by as much as 2.7° (the equation applies of course with θ measured in radians). This distortion can be eliminated by placing a second tapered slab 9 congruent to the first so that the two are adjacent but anti-parallel, with a small air gap between, as shown in FIG. 5.

Figure 6:
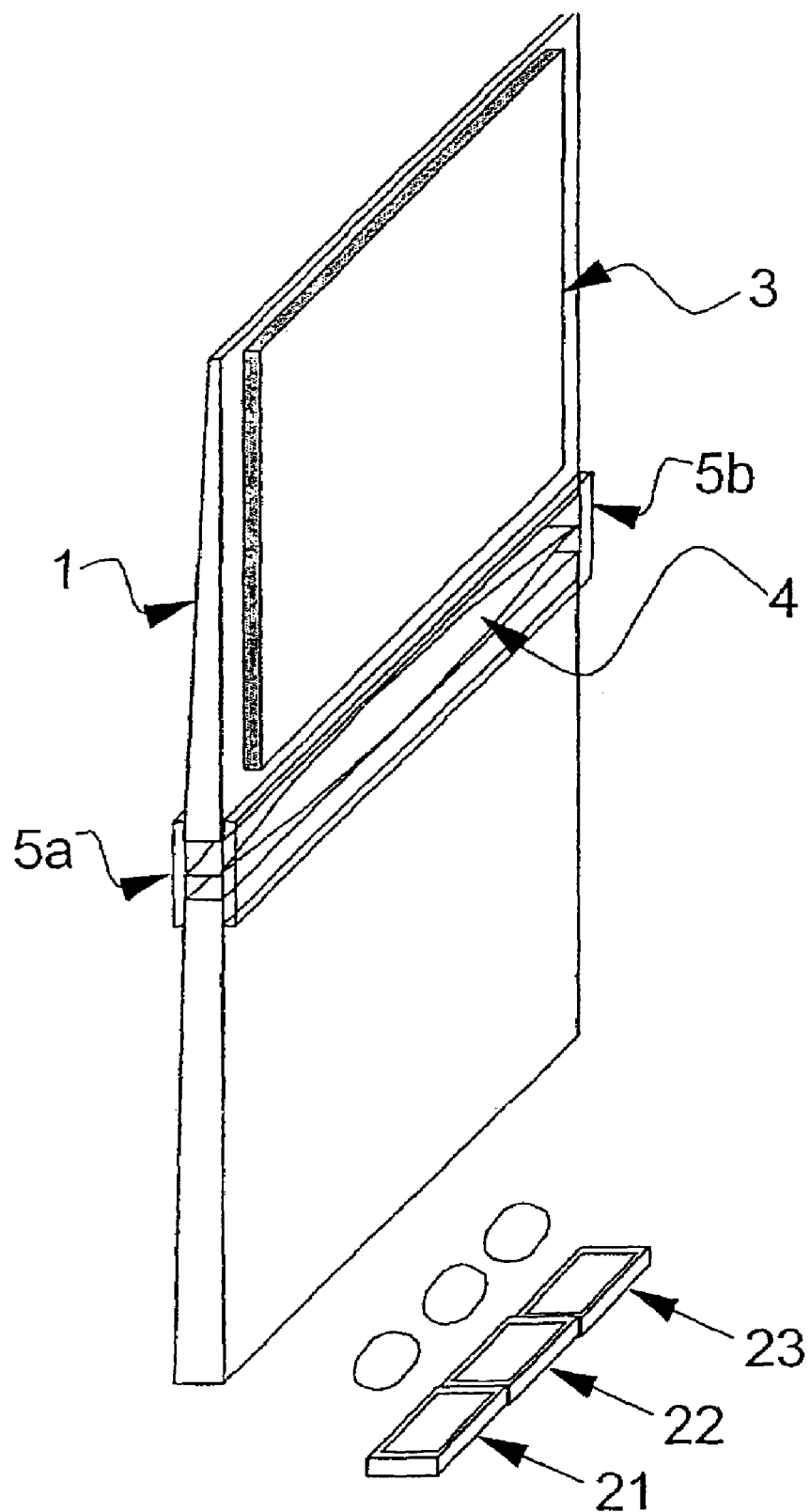
FIG. 6 illustrates a flat-panel camera which captures a three-dimensional image.

The flat-panel camera may also be used to collect views of the scene in front of the tapered slab 1 from different points of view, and these views together comprise a three-dimensional image of the scene. The views are collected by one camera each, e.g., 21, 22 and 23, along the thick end of the tapered slab 1, as shown in FIG. 6.

For the purposes of photocopying, the prismatic film 3 is superfluous and the printed surface of the paper to be photocopied should be placed against the surface of the tapered slab 1. Light may be shone onto the paper either through the rear of the paper, or through the opposite side of the tapered slab 1.

For the purposes of video-conferencing, the tapered slab may act as both display and camera. A translucent or phosphor screen may be placed against the surface of the tapered slab 1 opposite to the prismatic film 3, and a video projector may be optically combined with the miniature camera 2 using a beam splitter. The alignment of projector and camera 2 should be such that equivalent pixels transmit or receive rays along a shared optical path within the tapered slab 1. Transmitted rays will form an image on the translucent or phosphor screen which will be visible through the prismatic film 31 while received rays will be guided back to the miniature camera 2 as described above.

The invention claimed is:

1. A flat-panel camera comprising:
   a tapered transparent slab comprising a planar face and a thick end, the tapered transparent slab receiving light at a glancing angle into the planar face;
   a first miniature camera receiving light emerging from the thick end after internal reflection within the tapered transparent slab, at an angle dependent on the distance up the planar face at which the light entered the tapered transparent slab;
   an output slab continuing from the thick end; and
   a cylindrical collimating means directing light emerging from the thick end of the tapered transparent slab through the output slab towards the first miniature camera, wherein the cylindrical collimating means is placed between the tapered transparent slab and the output slab.

2. A flat-panel camera according to claim 1 further including a sheet on one face of the tapered transparent slab for adjusting an angle of entry of light into the tapered transparent slab.

3. A flat-panel camera according to claim 2, in which the sheet comprises a prismatic sheet for changing an angle of input light from a predetermined angle to the glancing angle.

4. A flat-panel camera according to claim 2, further including a compensating tapered slab between the sheet and the tapered transparent slab.

5. A flat-panel camera according to claim 1, and including an image processor associated with the first miniature camera for completing or correcting an image.

6. A flat-panel camera according to claim 1, including a second miniature camera facing the thick end of the tapered transparent slab at the same angle as the first miniature camera but reflected in a plane, for receiving internally reflected light that emerges after one more or fewer reflections than light received by the first miniature camera.

7. A flat-panel camera according to claim 1, including a mirror at the thick end of the tapered transparent slab and generally parallel to the tapered transparent slab, for reflecting towards the first miniature camera internally reflected light that emerges after one more or fewer reflections than light received directly by the first miniature camera.

8. A flat-panel camera according to claim 1, comprising a plurality of miniature cameras along the thick end of the slab.

9. A flat-panel camera according to claim 1, configured such that a document to be imaged is placed on a face of the slab.

* * * * *